No. 759,520. PATENTED MAY 10, 1904.
A. G. HOHENSTEIN.
STEAM BOILER.
APPLICATION FILED JUNE 1, 1903.
NO MODEL. 8 SHEETS—SHEET 4.

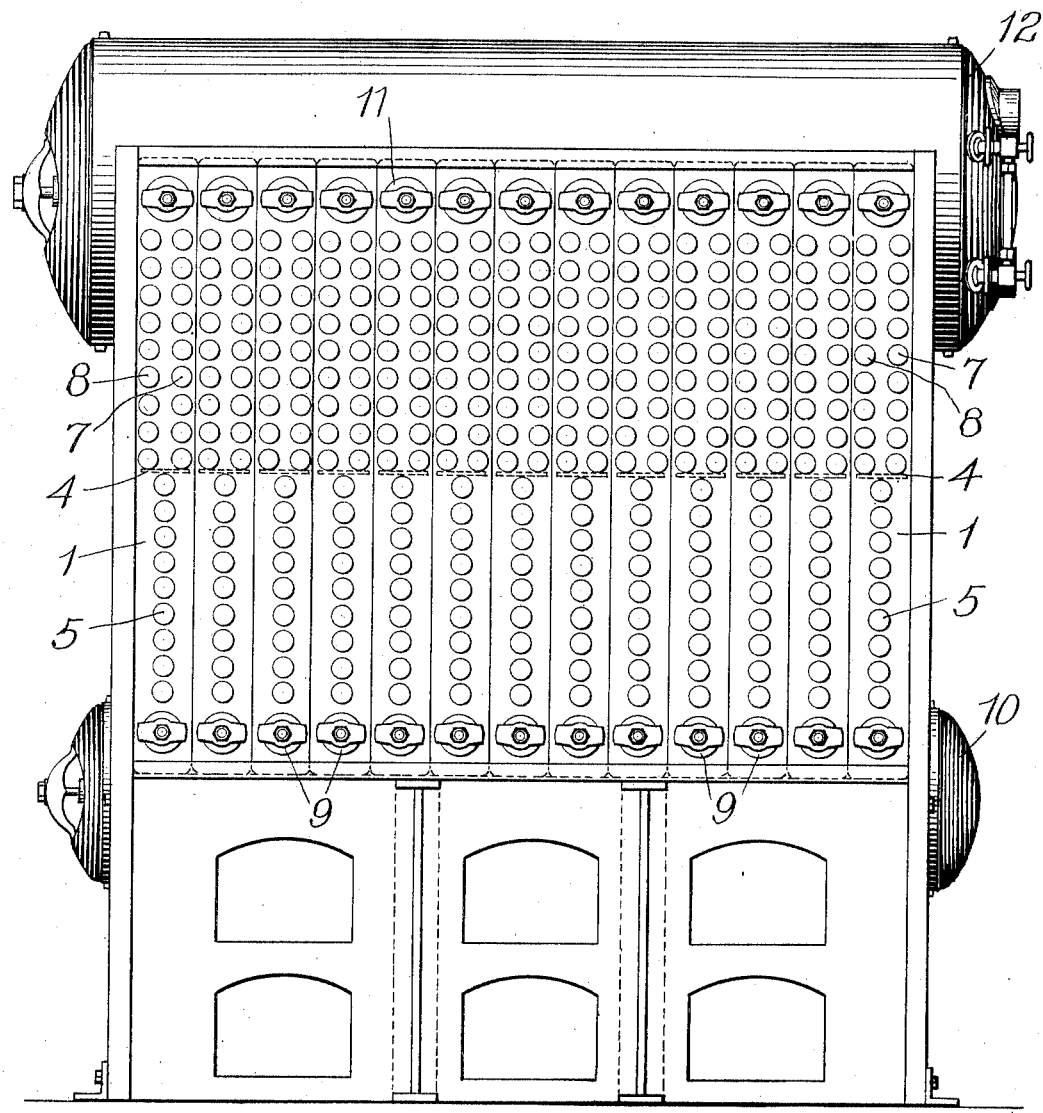

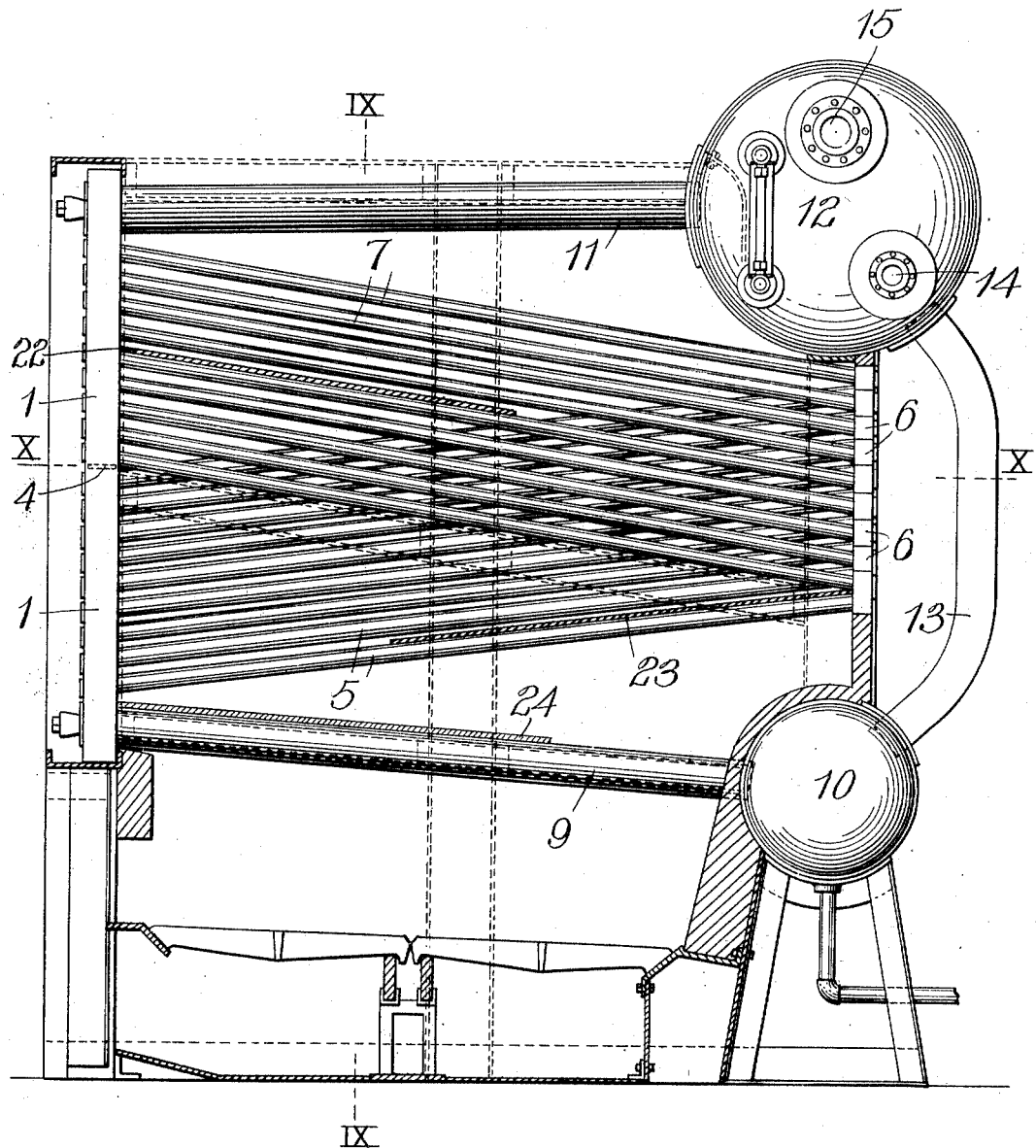

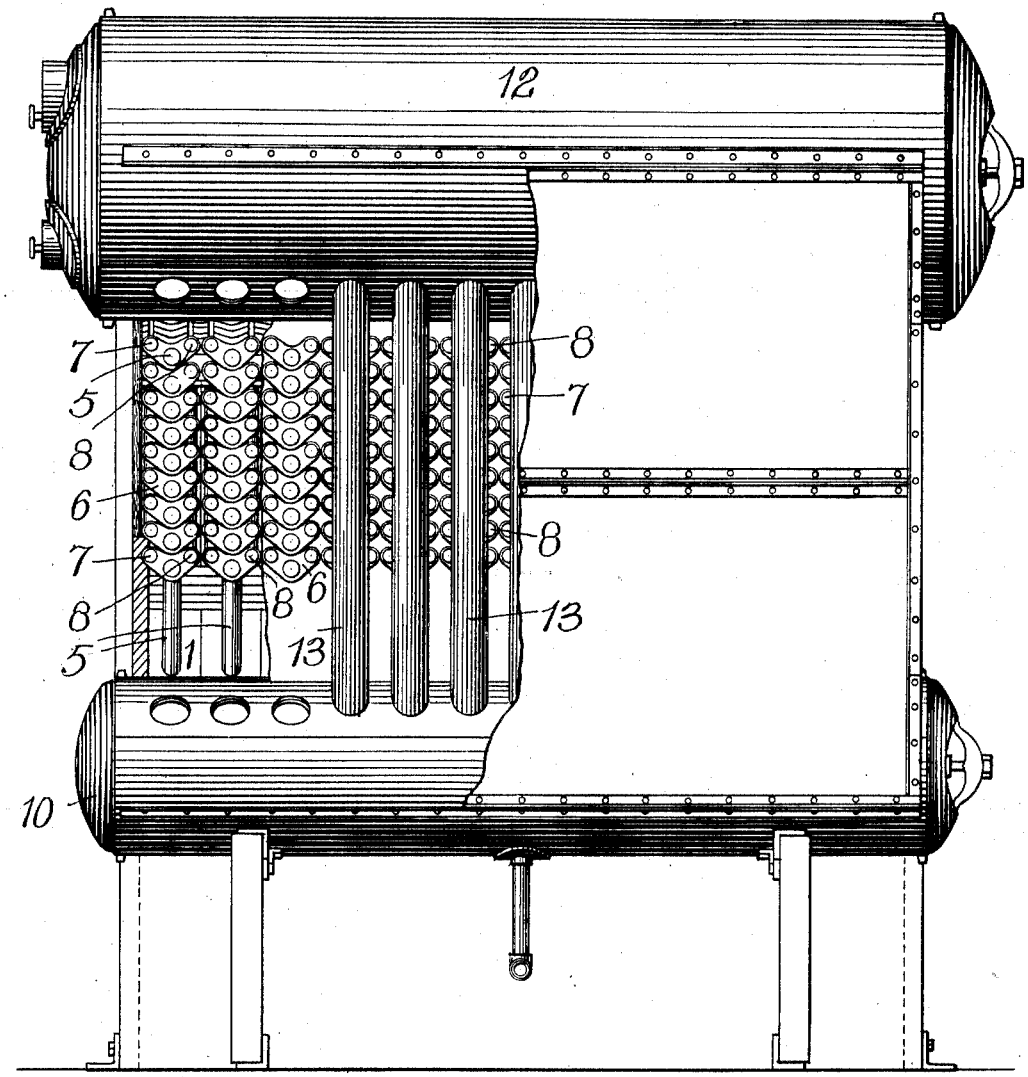
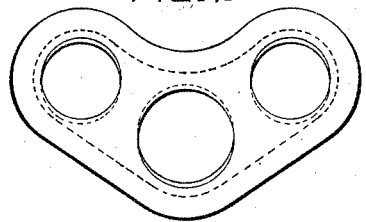
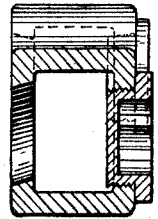

No. 759,520. PATENTED MAY 10, 1904.
A. G. HOHENSTEIN.
STEAM BOILER.
APPLICATION FILED JUNE 1, 1903.
NO MODEL. 8 SHEETS—SHEET 5.

No. 759,520. PATENTED MAY 10, 1904.
A. G. HOHENSTEIN.
STEAM BOILER.
APPLICATION FILED JUNE 1, 1903.
NO MODEL. 8 SHEETS—SHEET 7.

No. 759,520. PATENTED MAY 10, 1904.
A. G. HOHENSTEIN.
STEAM BOILER.
APPLICATION FILED JUNE 1, 1903.
NO MODEL. 8 SHEETS—SHEET 8.

WITNESSES:
INVENTOR

No. 759,520. Patented May 10, 1904.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 759,520, dated May 10, 1904.

Application filed June 1, 1903. Serial No. 159,684. (No model.)

*To all whom it may concern:*

Be it known that I, ARCHIE GERRY HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to certain improvements in water-tube boilers, and has for its object a construction wherein the main heating-surfaces, which pass across the boiler, are formed by three series of tubes, one of the series being larger than either of the others and equal or approximately equal to the combined capacity of the other two.

The invention is hereinafter more fully described and claimed.

Figure 6:
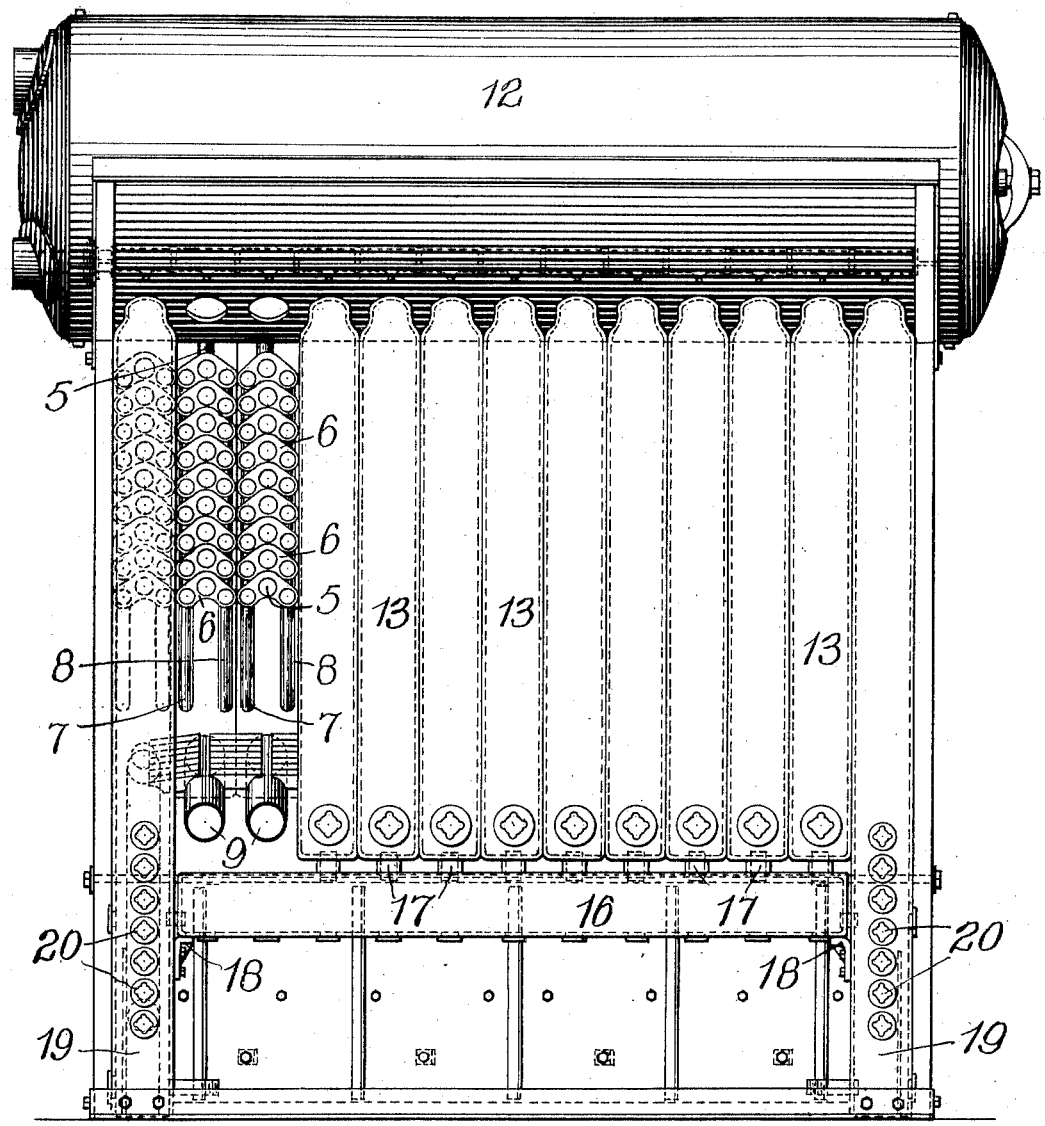
Figure 7:
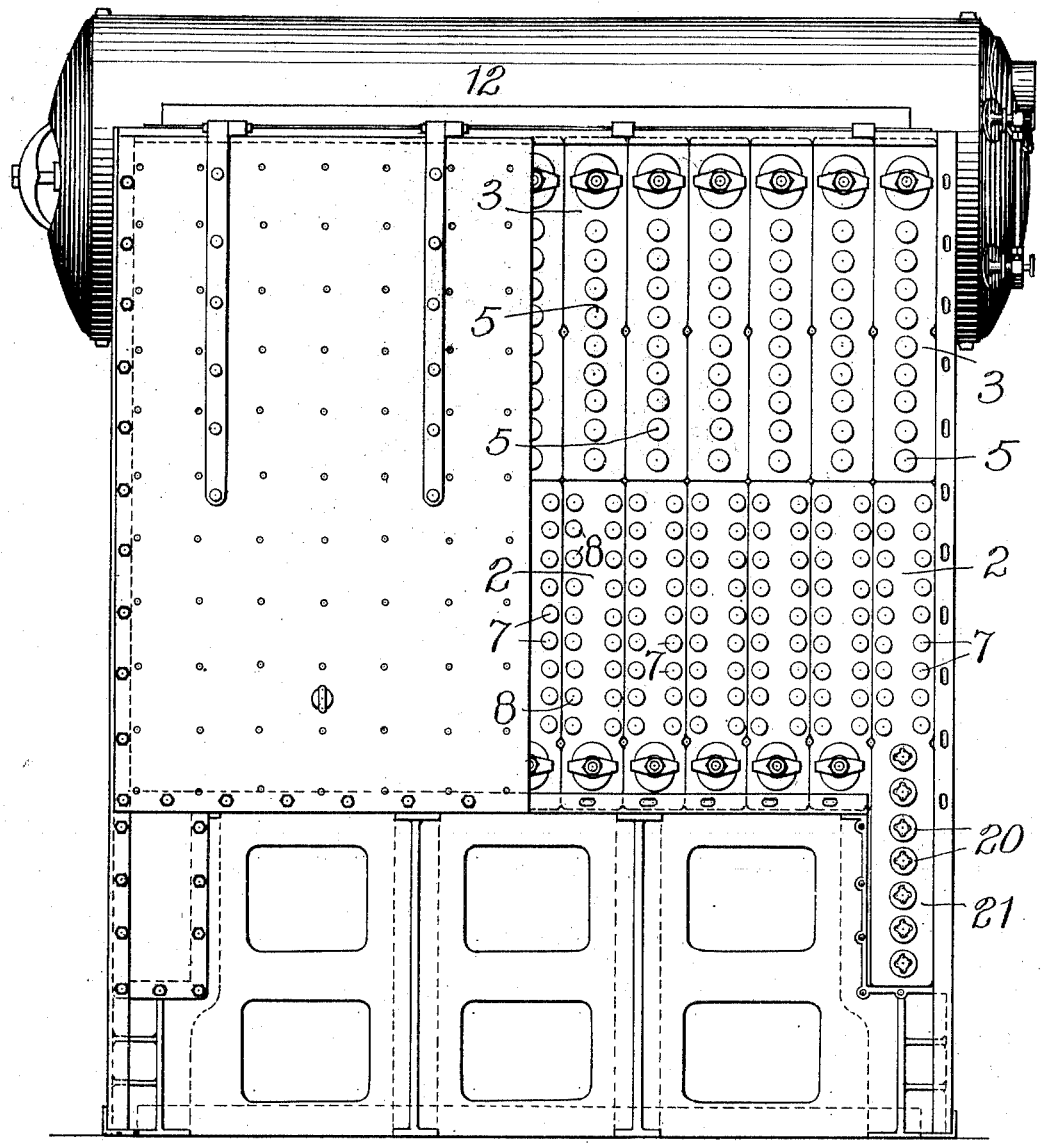
Figure 8:
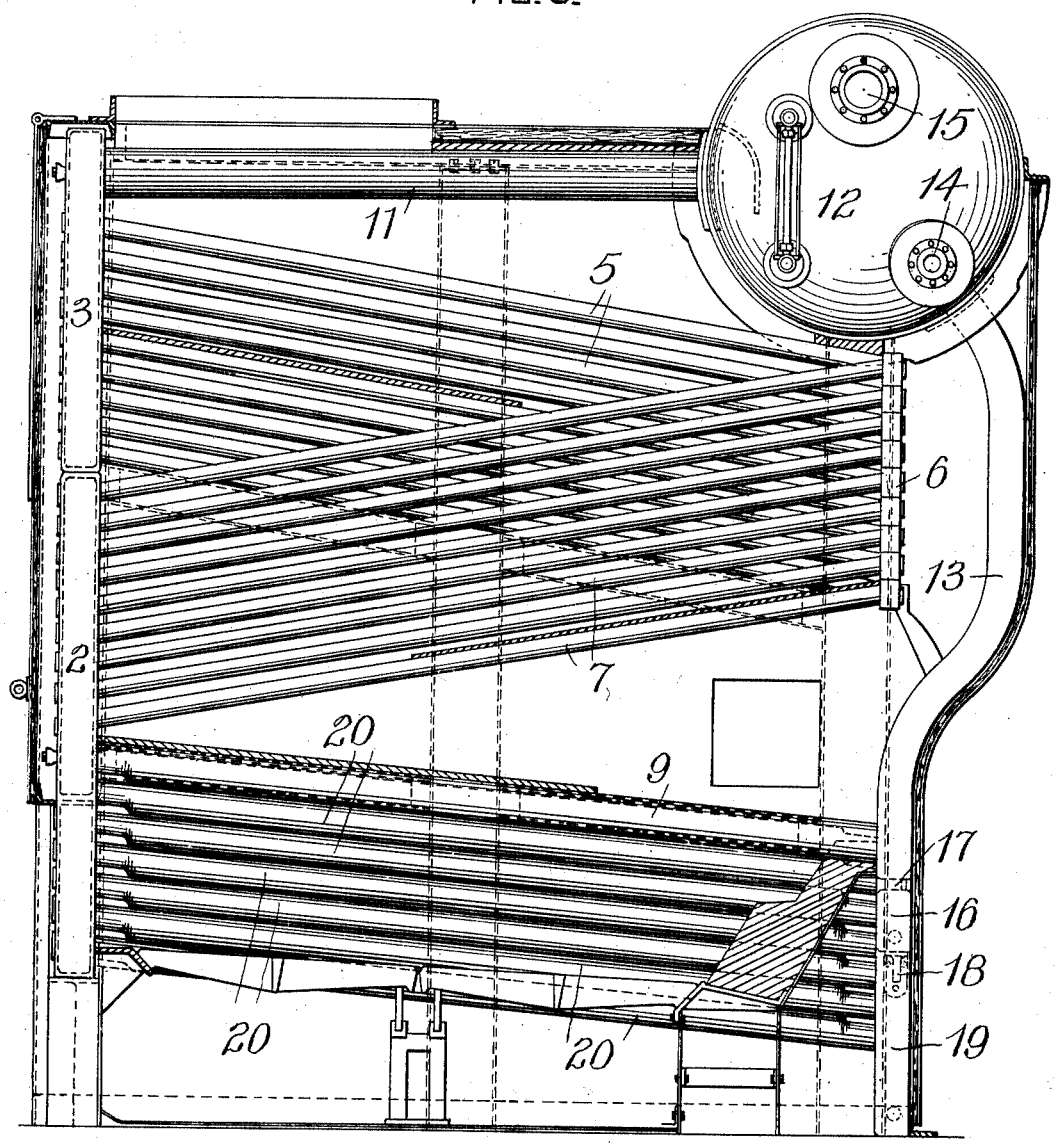
Figure 9:
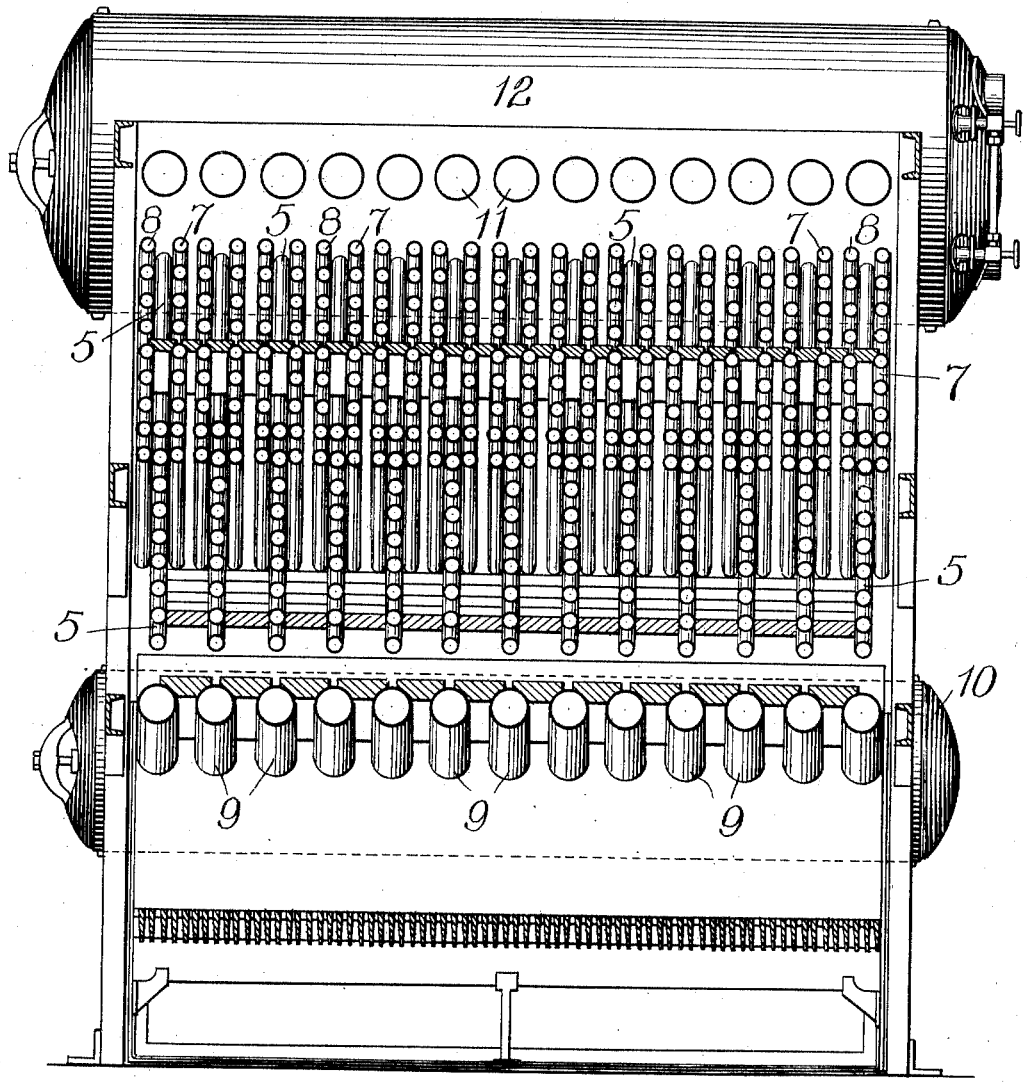
Figure 10:
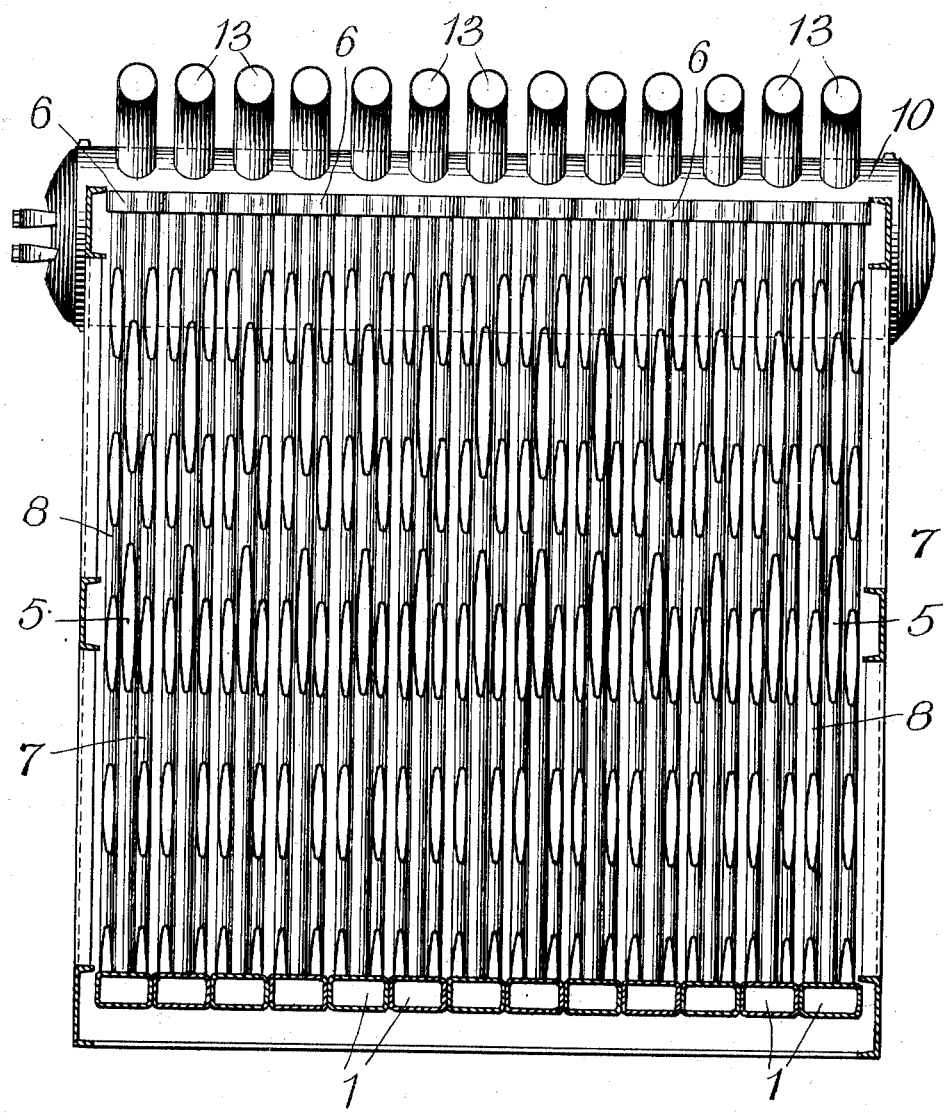

In the accompanying drawings, forming a part of this specification, Figure 1 is a front elevation of a boiler, the casing being removed, having my improvements applied thereto. Fig. 2 is a sectional elevation of the boiler shown in Fig. 1. Fig. 3 is a view of the rear end of the boiler, a portion of the casing being removed, and also several of the downtake-pipes. Figs. 4 and 5 are views in elevation and section, respectively, of the junction-box. Fig. 6 is a rear elevation of a modification of the form of boilers shown in Figs. 1, 2, and 3. Fig. 7 is a front elevation illustrating further modifications in the structure of the boiler. Fig. 8 is a sectional elevation of the construction shown in Fig. 7. Fig. 9 is a sectional elevation on a plane indicated by the line IX IX, Fig. 2; and Fig. 10 is a sectional plan view on a plane indicated by the line X X, Fig. 2.

In the practice of my invention I employ at the front end of the boiler a series of double-headers 1, as shown in Figs. 1, 2, and 3, or two series of single-headers 2 and 3, as shown in Figs. 7 and 8, arranged in line with each other vertically. When employing double-headers, a diaphragm or plate 4 is arranged transversely of the headers, separating the same into two compartments. A series of tubes 5 extend from the lower compartment of the double-headers or from the lower series 2 of the single-headers across the boiler and are connected at their rear ends to junction-boxes 6. To this junction-box are connected the rear ends of two series of tubes 7 and 8, which extend to the front end of the boiler and are either connected to the upper compartment of the double-headers 1 or to the upper series 3 of the single-headers. The pair of tubes originating in any one junction-box are connected to the same double-header as the tube 5, connected to the same junction-box. As was shown by reference to Figs. 3, 4, and 5, the junction-boxes are so constructed that the tube 5 is connected thereto at a point intermediate of and slightly out of line with the points of junction of the tubes 7 and 8 therewith. By this construction the tubes 5 of the lower series will lie in vertical planes intermediate of vertical planes through the upper series of tubes. The inner ends of the tubes 5, projecting, by preference, a short distance between or slightly overlap the inner ends of the upper series. The tubes of the series 5 are made of a capacity equal or approximately equal to the carrying capacity of the tubes of the series 7 and 8, so that a full supply of water for the tubes 7 and 8 can be maintained at all times.

The lower ends of the double-headers or of the lower series of single-headers are connected by furnace-tubes 9 with the downtakes 13 either directly or through the medium of a drum 10 at the lower rear corner of the boiler. These tubes 9 are made heavier than the other circulating-tubes, for the reason that they are arranged immediately above the fire and receive the direct impact of the flames and are made of such internal diameter as to have a delivery capacity equal or approximately equal to combined carrying capacity of all the tubes 5, leading from the headers 1. The upper ends of the double-headers or of the upper series 3 of single-headers are connected by tubes 11 with the upper rear drum 12 and are made of a carrying capacity equal or approximately equal to the delivery capacity of the two series of tubes 7 and 8, so that the water may have a free flow to the rear drum 12. The rear drums 10 and 12 are connected by downtakes 13, which have a carrying capacity equal or approximately equal to the delivering capacity of the tubes 11.

For the convenience of description it will be supposed that the circulation starts from the lower drum 10, although as a matter of fact the feed-water is, by preference, discharged through the pipe into the upper drum at points adjacent to the upper ends of the downtake-pipes 13. From the drum 10 the water flows by the tubes 9 to the lower ends of the front headers and thence by the series of the tubes 5 to the junction-boxes 6, where the water is divided into two streams and passes by the two series of tubes 7 and 8 to the upper portion of the double-header or to the upper series of the single-headers. From thence the water flows by the tubes 11 to the steam and water drum 12, where a separation of the steam and water is effected, the steam being carried away by the dry-pipe 15.

The lower drum 10 serves not only as a supply for the furnace-tubes 9, but also as an equalizing-chamber, so as to insure a full and equal supply of water through all these tubes. This latter function—i. e., equalizing the circulation—can be effected by arranging the drum or its equivalent outside of the circulation, as shown in Fig. 6, where the downtakes are connected at points below the junction of the furnace-tubes 11 therewith to an equalizing-chamber formed by a box 16. Any suitable means for connecting the downtakes to the box may be employed; but it is preferred to form such connection by means of nipples 17. The box 16 is supported in any suitable manner—as, for example, upon brackets 18, secured to downward extensions of the end downtakes. When the outer or end downtakes are extended down below the intermediate downtakes, the ends of the equalizing-box 16 should be connected thereto in any suitable manner, as by nipples, as shown in Fig. 6. The furnace-tubes 9 will in this construction of boiler have their inner ends connected to the lower ends of the intermediate downtakes, as clearly indicated in Fig. 6; but the end downtakes have their extensions 19 connected by tubes 20 to extensions 21 of the end headers, as shown in Figs. 6, 7, and 8. These tubes have their ends reduced, so that their body portions may be in contact and a sufficient body of metal provided for the bridges between openings in the headers and downtakes for these tubes.

It will be observed that a large portion of the series of tubes 5 intercalate with the tubes of series 7 and 8, as shown in Figs. 2, 7, 8, and 9, so that the tubes of series 7 and 8 baffle gases passing between horizontally-adjacent tubes 5, and these latter tubes baffle the gases between tubes of series 7 and 8, and, further, the arrangement of tubes facilitates such baffling of the boiler as to render the cleaning of the baffles and tubes easy. As shown, the upper baffle 22 extends from the headers toward the rear of the boiler, following the inclination of the tubes 7 and 8, so that this baffle may be cleaned from the front of the boiler, the dust, &c., dropping into the baffle 23, inclined downwardly from the rear of the boiler, following the inclination of tubes 5. The dust, &c., from this baffle and the tubes 5 can be discharged onto the baffle 24, from which the dust, &c., can be forced in the fire-box.

The tubes 9, which receive the first and heaviest impact of the heat, are made larger than any of the tubes 5, 7, and 8 and having a carrying capacity equal or approximately equal to all the tubes 5, 7, and 8, connecting with the same header—as, for example, in the construction shown the tubes 9 are five inches in diameter, the tubes 5 are two and a half inches in diameter and have thinner walls than the tubes 9, and the tubes 7 and 8 are two inches in diameter and of smaller gage metal than the tubes 5. It is characteristic of this construction that the largest bodies of water are subjected to the highest heat, and as the heat decreases with the passage of the gases up through the boiler the water is subdivided into smaller bodies in the tubes 5, having larger heat-absorbing surfaces, and again subdivided into still smaller bodies or streams with a large increase in heating-surfaces by the tubes 7 and 8. In other words, as the gases decrease in temperature the water is separated into small bodies or streams with a corresponding increase in heating-surface.

As the tubes are connected to the headers either along the center line of the headers, as in the case of the tubes 9 and 5, or at equal distances from and on opposite sides of the center line of the headers, no offsetting of the headers or other portions of the boiler are necessary.

It is characteristic of my improvement that the circulation is of the "loop" type found in all of the Hohenstein type of boiler—as, for example, the circulation starts from the lowest part of the boiler (i. e., the drum 10 or the lower ends of the downtakes) and passes along the tubes 9, the lower water-chamber, the series of tubes 5, the two series of tubes 7 and 8 to the upper water-chamber, and by suitable return connections, in this case the tubes 11, drum 12, and downtakes 13, to the initial point.

As shown in Figs. 6, 7, and 8, the series of tubes 5, 7, and 8 may be reversed, the two series of tubes 7 and 8 being connected to the lower water-chamber and the single series of tubes 5 connected to the upper water-chamber.

I claim herein as my invention—

1. In a water-tube boiler, the combination of two series of water-chambers, and three connected series of tubes extending from the rear of the boiler and connected one series to one series of water-chambers and the other series to the other series of water-chambers, substantially as set forth.

2. In a water-tube boiler, the combination of two series of water-chambers arranged at one side or end of the boiler, three connected series of tubes extending from the opposite side or end of the boiler, and connected one series to one series of water-chambers and the other series to the other series of water-chambers, and a return connection from the upper to the lower chamber, substantially as set forth.

3. In a water-tube boiler, the combination of two series of water-chambers, a series of tubes extending from series of chambers toward the rear of the boiler, two series of tubes extending from the other series of water-chambers toward the rear of the boiler and connected to the other series, a drum connected to the upper series of water-chambers, and downtakes extending from the drum and connected to the lower water-chambers, substantially as set forth.

4. In a water-tube boiler, the combination of a series of headers, three connected series of tubes extending from the rear of the boiler and connected to the headers, a return connection from the upper portions of the headers to the lower portions thereof, and water-walls forming portions of such return connections, substantially as set forth.

5. In a water-tube boiler, the combination of two water-chambers, three connected series of tubes extending from the rear of the boiler to said chambers, a drum connected to the upper water-chamber, downtakes extending from the drum, and furnace-tubes extending from the downtakes to the lower water-chambers, substantially as set forth.

6. In a water-tube boiler, the combination of two series of headers, the headers at the ends of the lower series being extended downwardly, three connected series of tubes extending from the rear of the boiler to said headers, a series of downtakes connected to the upper series of headers, the downtakes at the ends of the series being extended, tubes connecting the intermediate downtakes with the intermediate headers, and water-wall tubes connecting the extensions of the downtakes with the extensions of the headers, substantially as set forth.

In testimony whereof I have hereunto set my hand.

ARCHIE G. HOHENSTEIN.

Witnesses:
 DARWIN S. WOLCOTT,
 J. C. DAVIDSON.